United States Patent [19]

Morikawa et al.

[11] 4,411,864
[45] Oct. 25, 1983

[54] CU-AG-SI BASE ALLOY BRAZING FILLER MATERIAL

[75] Inventors: Masaki Morikawa; Hideaki Yoshida, both of Kasukabe; Kunio Kishida, Ohmiya; Chuji Tanaka, Ageo, all of Japan

[73] Assignee: Mitsubishi Kinzoku Kabushiki Kaisha, Tokyo, Japan

[21] Appl. No.: 406,236
[22] PCT Filed: Nov. 18, 1981
[86] PCT No.: PCT/JP81/00338
 § 371 Date: Jul. 30, 1982
 § 102(e) Date: Jul. 30, 1982
[87] PCT Pub. No.: WO82/02013
 PCT Pub. Date: Jun. 24, 1982

[30] Foreign Application Priority Data
 Dec. 8, 1980 [JP]  Japan .............................. 55/172965

[51] Int. Cl.$^3$ ............................................. C22C 30/02
[52] U.S. Cl. ..................................... 420/587; 420/502

[58] Field of Search ................ 420/502, 497, 587, 490

[56]  References Cited
U.S. PATENT DOCUMENTS 2,196,303  4/1940  Hensel et al. ........................ 420/502
2,279,282  4/1942  Wassermann ........................ 420/587
2,953,844  9/1960  Gelb et al. .......................... 420/502

Primary Examiner—Peter K. Skiff
Attorney, Agent, or Firm—Frishauf, Holtz, Goodman & Woodward

[57]  ABSTRACT

A Cu-Ag alloy brazing material that exhibits excellent cold workability, brazability and has a low vapor pressure is disclosed. The filler material comprises more than 35 to 50% by weight of Ag, 2.2 to 6% by weight of Si, with the balance being Cu and incidental impurities. The properties of the filler material can be improved further by addition of at least one element selected from the group consisting of Sn, In, Fe, Ni, Co, B and Li.

8 Claims, No Drawings

CU-AG-SI BASE ALLOY BRAZING FILLER MATERIAL

TECHNICAL FIELD

The present invention relates to an inexpensive Cu-Ag base alloy brazing filler material that has a relatively low silver content and yet achieves satisfactory cold workability, brazability and low vapor pressure.

BACKGROUND ART

The technique of vacuum brazing is used to fabricate electron tubes and vacuum tubes. If a brazing filler material having high vapor pressure is exposed to the vacuum brazing atmosphere, the vapor fouls the area to be brazed as well as the inner wall of the vacuum furnace. The brazed part is also exposed to high temperatures during the service of the tubes, and the filler material is evaporated to give a vapor that not only reduces the degree of vacuum in the tubes but also fouls their interior. For these reasons, an alloy having low vapor pressure is used as the brazing filler material. Typical filler materials having low vapor pressure include an Ag-Cu alloy filler material (silver brazing filler material BAg-8 of JIS Z 3261) consisting of 27–29% Cu with the balance being Ag and incidental impurities and an Ag-Cu-Sn alloy brazing filler material consisting of 59–61% Ag, 9.5–10.5% Sn, with the balance being Cu and incidental impurities (all percents used herein are by weight). One example of each type is listed in Table 26.1 on page 297 of "Brazing Manual" published by Kogaku Tosho Shuppan, October 1980 which is a translation of "Brazing Manual", 3rd ed., edited by American Welding Society, 1976. These conventional Ag-Cu base alloy brazing filler materials have good brazability, but their silver content is so high that with the rapid increase and considerable fluctuation in the price of silver in recent years, economic considerations put rigid limits on expanding the applications of these filler materials. Attempts have been made to reduce the silver content, but this results in reduced wettability and increased brazing temperatures, which in turn impair the brazability, the cold workability in particular, of the filler materials, and the filler materials cannot be worked into a foil or very fine wire that is required in electronics to fabricate ICs and LSIs.

DISCLOSURE OF THE INVENTION

Therefore, the present inventors made studies to produce a brazing filler material that has a relatively low silver content, and also achieves good brazability and satisfactory cold workability and has low vapor pressure. As a result, they successfully obtained an alloy that meets all of these requirements. The alloy filler material according to the present invention comprises more than 35 to 50% of Ag, 2.2 to 6% of Si, 1 to 4% of at least one optional element selected from among Sn and In, 0.001 to 0.5% of at least one optional element selected from among B and Li, and 1 to 5% of at least one element selected from among Fe, Ni and Co, with the balance being Cu and incidental impurities. This Cu-Ag base alloy, having a relatively low Ag content, has cold workability acceptable for practical purposes. More than that, it has better brazability than the conventional Ag-Cu base alloy filler material of high Ag content, as well as reduced vapor pressure.

The present invention has been accomplished on the basis of these findings. The criticality of the amounts of the respective components defined above is described below.

(a) Ag

Silver is effective not only in improving the cold workability of filler materials but also in lowering their melting point and improving their wettability. If the silver content is 35% or less, these effects are not achieved. On the other hand, even if the content is more than 50%, no corresponding improvement is obtained. Therefore, by economic considerations, the silver content is limited to the range of from more than 35% to not more than 50%.

(b) Si

Silicon is capable of improving the wettability of the filler material without increasing its vapor pressure. Silicon is also capable of reducing the melting point of the filler material by forming a Cu-Ag-Si ternary eutectic system. If the silicon content is less than 2.2%, these effects are not achieved. On the other hand, if the content exceeds 6%, the cold workability of the filler material is impaired to make its working into a foil or very fine wire difficult. Therefore, the silicon content is limited to the range of from 2.2 to 6%.

(c) Sn and In

The two elements are equivalents which are able to further reduce the melting point of the filler material and achieve further improvement in its wettability, so they are used if an even lower melting point and better wettability are required. If the total of their content is less than 1%, their effects mentioned above are not achieved, and if their content exceeds 4%, the cold workability of the filler material is impaired. Therefore, the sum of the contents of Sn and In is limited to the range of from 1 to 4%.

(d) B and Li

The two elements are equivalents which are able not only to prevent the oxidation of the filler material during brazing and reduce the oxide on the surface of the objects to be brazed but they also inhibit greatly the dissolution of gases into the melted filler material, so they are used if these effects are desired. If the total of their content is less than 0.001%, their effects mentioned above are not achieved, and if their content exceeds 0.5%, the cold workability of the filler material is impaired. Therefore, the sum of the contents of B and Li is limited to the range of from 0.001 to 0.5%.

(e) Fe, Ni and Co

The three elements are equivalents which are able to increase the strength of the filler material without reducing its ductility, so they are used if greater strength is required. If the total of their content is less than 1%, the desired effect to provide greater strength is not assured. If their content exceeds 5%, the cold workability of the filler material is impaired and its melting point increased. Therefore, the sum of the contents of Fe, Ni and Co is limited to the range of from 1 to 5%.

EXAMPLE

The alloy filler materials of the present invention are now described in greater detail by reference to the following example wherein their performance is compared with that of conventional brazing alloys.

By a known method of casting and hot working, brazing filler samples Nos. 1 to 26 of the present invention were prepared. They had the compositions indicated in Table 1 and measured 100 mm wide, 200 mm long and 5 mm thick. As controls, conventional Ag-Cu base alloy filler materials Nos. 1 and 2 that had the same measurements and had high Ag content were prepared. The twenty-eight samples were cold rolled to reduce the thickness by 0.5 mm by one pass, and the number of passes required for the samples to develop cracks widthwise that reduced the width of the sound area to 70 mm was counted. In compliance with JIS Z 3191, the respective samples were put on a stainless steel plate JIS SUS 316 and heated at 850° C. in an argon atmosphere, and the area of the spread of the samples over the stainless steel plate was measured. Thereafter, the vapor pressure of the brazing filler samples which were as though they brazed the stainless steel plate was measured at 600° C. with a Rodebush Walter apparatus (see "Vacuum Engineering Handbook", published by Asakura Shoten, October 1965, p. 321).

As shown in Table 1, Sample Nos. 1 to 26 of the present invention have poorer cold workability than Control No. 1 having high Ag content, but their cold workability is sufficient for cold working them into a foil or very fine wire. On the other hand, the samples of the present invention have much greater wettability and fluidity and lower vapor pressure than Controls Nos. 1 and 2.

As described in the foregoing, the alloy filler materials of the present invention are inexpensive since their silver content is fairly small. In spite of their relatively low Ag content, the cold workability of the filler materials is satisfactory for practical purposes and they can be easily worked into a foil or very fine wires. What is more, the filler materials have very great brazability and very low vapor pressure, so that they enable an easy and smooth brazing operation, providing a brazed part of high quality.

TABLE 1-1

| Sample No. | Ag | Si | Sn | In | B | Li | Fe | Ni | Co | Cu | No. of Passes | Spread of filler material (cm$^2$) | Vapor Pressure at 600° C. ($\times 10^{-8}$ mmHg) |
|---|---|---|---|---|---|---|---|---|---|---|---|---|---|
| Filler 1 | 35.2 | 3.5 | — | — | — | — | — | — | — | Bal. | 18 | 0.92 | 1.0 or less |
| of the 2 | 43.7 | 2.2 | — | — | — | — | — | — | — | " | 23 | 0.89 | 2.0 |
| Present 3 | 49.8 | 1.1 | — | — | — | — | — | — | — | " | 29 | 0.86 | 3.5 |
| Inven- 4 | 41.0 | 5.9 | — | — | — | — | — | — | — | " | 14 | 1.13 | 3.5 |
| tion 5 | 40.5 | 2.4 | — | 3.8 | — | — | — | — | — | " | 19 | 1.08 | 4.5 |
| 7 | 40.5 | 2.5 | 2.2 | — | — | — | — | — | — | " | 20 | 1.05 | 3.0 |
| 8 | 41.5 | 3.1 | — | — | 0.12 | 0.06 | — | — | — | " | 17 | 1.09 | 4.0 |
| 9 | 38.9 | 3.2 | — | — | — | 0.18 | — | — | — | " | 17 | 1.08 | 4.5 |
| 10 | 42.1 | 2.8 | — | — | 0.46 | — | — | — | — | " | 19 | 1.11 | 3.0 |
| 11 | 41.1 | 2.9 | — | — | 0.0012 | — | — | — | — | " | 20 | 1.01 | 3.0 |
| 12 | 41.2 | 3.0 | — | — | — | — | — | — | 1.1 | " | 18 | 1.01 | 3.0 |
| 13 | 40.3 | 3.4 | — | — | — | — | — | 4.8 | — | " | 18 | 0.88 | 3.0 |
| 14 | 40.3 | 3.5 | — | — | — | — | 1.2 | — | — | " | 18 | 0.95 | 3.0 |
| 15 | 40.5 | 3.5 | — | — | — | — | 0.5 | 0.6 | — | " | 18 | 0.94 | 3.0 |

TABLE 1-2

| Sample No. | Ag | Si | Sn | In | B | Li | Fe | Ni | Co | Cu | No. of Passes | Spread of filler material (cm$^2$) | Vapor Pressure at 600° C. ($\times 10^{-8}$ mmHg) |
|---|---|---|---|---|---|---|---|---|---|---|---|---|---|
| Filler 16 | 41.0 | 3.4 | — | — | — | — | — | 0.6 | 0.7 | Bal. | 17 | 0.95 | 3.0 |
| of the 17 | 40.5 | 3.6 | — | — | — | — | 1.4 | 1.5 | 1.5 | " | 16 | 0.88 | 3.0 |
| Present 18 | 49.9 | 3.0 | 1.1 | — | 0.01 | — | — | — | — | " | 19 | 1.01 | 3.5 |
| Inven- 19 | 49.8 | 3.1 | 0.5 | 0.6 | 0.01 | 0.01 | — | — | — | " | 18 | 1.03 | 4.0 |
| tion 20 | 45.1 | 3.4 | — | — | 0.005 | — | — | 1.1 | — | " | 18 | 0.98 | 3.5 |
| 21 | 40.5 | 2.9 | — | — | — | 0.0015 | 2.1 | — | — | " | 19 | 0.93 | 3.5 |
| 22 | 40.4 | 3.1 | — | — | 0.03 | 0.002 | 0.5 | 0.6 | 0.4 | " | 18 | 0.95 | 4.0 |
| 23 | 40.5 | 3.1 | 1.1 | — | — | — | 0.3 | 0.9 | — | " | 18 | 0.96 | 4.0 |
| 24 | 40.3 | 3.3 | — | 1.2 | — | — | — | 0.6 | 0.6 | " | 18 | 0.97 | 4.0 |
| 25 | 41.0 | 3.5 | 0.4 | 0.8 | — | — | 0.5 | 0.5 | 0.5 | " | 16 | 0.94 | 4.0 |
| 26 | 40.9 | 3.5 | 1.1 | 1.6 | 0.05 | 0.03 | 1.4 | 1.4 | 1.5 | " | 15 | 0.95 | 4.5 |
| Conven- 1 | 73.0 | — | — | — | — | — | — | — | — | " | 36 | 0.70 | 5.0 |
| tional 2 | 60.2 | — | 10.1 | — | — | — | — | — | — | " | 18 | 0.68 | 5.0 |
| Filler | | | | | | | | | | | | | |

We claim:

1. A Cu-Ag alloy brazing filler material having excellent cold workability and brazability and a low vapor pressure comprising from more than 35 to 50% by weight of Ag, 2.2 to 6% by weight of Si, with the balance being Cu and incidental impurities.

2. The Cu-Ag alloy brazing filler material according to claim 1 which further contains 1 to 4% by weight of at least one of Sn and In.

3. The Cu-Ag alloy brazing filler material according to claim 1 which further contains 0.001 to 0.5% by weight of at least one of B and Li.

4. The Cu-Ag alloy brazing filler material according to claim 1 which further contains 1 to 5% by weight of at least one element selected from the group consisting of Fe, Ni and Co.

5. The Cu-Ag alloy brazing filler material according to claim 2 which further contains 1 to 5% by weight of at least one element selected from the group consisting of Fe, Ni and Co.

6. The Cu-Ag alloy brazing filler material according to claim 2, which further contains 0.001 to 0.5% by weight of at least one of B and Li.

7. The Cu-Ag alloy brazing filler material according to claim 4, which further contains 0.001 to 0.5% by weight of at least one of B and Li.

8. The Cu-Ag brazing filler material according to claim 5, which further contains 0.001 to 0.5% by weight of at least one of B and Li.

* * * * *